(12) United States Patent
Zhu et al.

(10) Patent No.: US 6,344,852 B1
(45) Date of Patent: Feb. 5, 2002

(54) OPTIMIZED SYSTEM AND METHOD FOR BINNING OF GRAPHICS DATA

(75) Inventors: Ming Benjamin Zhu, San Jose; Scott C. Heeschen, Campbell, both of CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/271,636

(22) Filed: Mar. 17, 1999

(51) Int. Cl.$^7$ ............................................... G06T 17/00
(52) U.S. Cl. ....................................................... 345/418
(58) Field of Search ................................ 345/418, 419, 345/428, 420, 422, 431

(56) References Cited

U.S. PATENT DOCUMENTS

| | | | |
|---|---|---|---|
| 4,876,651 A | 10/1989 | Dawson et al. | |
| 5,339,386 A | 8/1994 | Sodenberg et al. | |
| 5,509,110 A | 4/1996 | Latham | |
| 5,561,750 A | 10/1996 | Lentz | |
| 5,613,050 A | 3/1997 | Hochmuth et al. | |
| 5,886,701 A | 3/1999 | Chauvin et al. | |
| 5,936,642 A | 8/1999 | Yumoto et al. | |
| 5,953,506 A | * 9/1999 | Kalra et al. | ................... 345/428 |
| 6,034,699 A | 3/2000 | Wong et al. | |
| 6,104,415 A | * 8/2000 | Gossett | .......................... 345/513 |
| 6,154,223 A | * 11/2000 | Baldwin | ....................... 345/506 |
| 6,166,748 A | * 12/2000 | Van Hook et al. | ........... 345/522 |
| 6,222,550 B1 | * 4/2001 | Rosman et al. | .............. 345/419 |

OTHER PUBLICATIONS

Foley et al. "Computer Graphics: Principles and Practices", Addison–Wesley Publishing Co., $2^{nd}$ in C. pp. 91–92, 673, 873–874.

* cited by examiner

Primary Examiner—Cliff N. Vo
(74) Attorney, Agent, or Firm—Babak S. Sani; Townsend and Townsend and Crew LLP (57) ABSTRACT

A system and method implemented in hardware are provided to optimize rendering of a computer graphics image, which may be displayed in an image frame comprising a number of tiles. The system and method determine each tile in the image frame touched by a geometry (e.g., a triangle). Graphics data for the geometry is selectively stored into a separate, corresponding portion of memory for each tile touched by the geometry. The graphics data stored in each portion of memory can be readily accessed and used to render a portion of the image in the respective tile of the image frame.

43 Claims, 6 Drawing Sheets

OPTIMIZED SYSTEM AND METHOD FOR BINNING OF GRAPHICS DATA

CROSS-REFERENCE TO RELATED APPLICATIONS

This Application relates to the subject matter disclosed in the following co-pending United States Applications:

U.S. application Ser. No. 08/978,491, filed Nov. 25, 1997, entitled "Rendering Pipeline;"

U.S. application Ser. No. 09/271,637, filed Mar. 17, 1999, entitled "A Method for Determining Tiles In a Computer Display That Are Covered by a Graphics Primitive;"

U.S. application Ser. No. 09/271,026, filed Mar. 17, 1999, entitled "A Circuit and Method For Deferring the Binding of Render States to Primitives In a Graphics System;" and U.S. application Ser. No. 09/271,613, filed Mar. 17, 1999, entitled "A Circuit and Method For Processing Render Commands In a Tile-Based Graphics System;"

The above co-pending applications are assigned to the present Assignee and are incorporated herein by reference in their entirety.

FIELD OF THE INVENTION

This invention relates to computer graphics, and in particular, to an optimized system and method for binning of graphics data.

CROSS REFERENCE TO MICROFICHE APPENDIX

Appendix A, which is part of the present disclosure, is included in a microfiche appendix consisting of 1 sheet of microfiche having a total of 31 frames, such microfiche appendix incorporated herein by reference in its entirety. Appendix A is a listing of pseudo-code for implementing a hardware binning engine according to an embodiment of this invention as described more completely below.

A portion of the disclosure of this patent document contains material that is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND OF THE INVENTION

In the field of modern computer graphics, low-level objects—such as points, line segments, polygons (e.g., triangles, parallelograms, trapezoids, etc.), text, curves, surfaces, and the like—are used to generate images for display on, for example, a computer monitor. The process of creating realistic graphics scenes from these low-level objects is commonly known as "rendering." In order to create the most realistic computer graphics, the process of rendering should be optimized.

SUMMARY

According to an embodiment of the present invention, a method implemented in hardware for optimizing the rendering of an image includes the following steps: determining each tile in an image frame touched by a geometry; and selectively storing graphics data for the geometry into a separate, corresponding portion of memory for each tile touched by the geometry.

According to another embodiment of the present invention, a graphics system includes a binning engine implemented in hardware which can determine each tile in an image frame touched by a geometry. A separate portion of memory corresponding to each tile touched by the geometry is coupled to the binning engine. Each portion of memory selectively stores graphics data for the geometry.

According to yet another embodiment of the present invention, a binning engine implemented in hardware includes a buffer operable to buffer graphics data, the graphics data specifying one or more geometries. A geometry tiler, coupled to the buffer, identifies each geometry specified in the graphics data which touches a tile. A synchronizer is coupled to the geometry tiler. The synchronizer coordinates the storage of graphics data for each identified geometry into a separate portion of memory corresponding to the tile.

A technical advantage of the present invention includes a binning engine implemented in hardware which receives graphics data describing geometries and modes for an image to be displayed. The binning engine associates the geometries and modes with various regions of an image frame referred to as tiles. The resultant data is placed into a number of memory blocks or bins, with a separate bin provided for each tile. The data in each bin can be readily accessed in order to draw the relevant portion of the image within the respective tile or region of the image frame.

A technical advantage of the present invention includes a binning engine implemented in hardware. Compared to a binning engine implemented in software, a hardware binning engine reduces the workload of a host processor and optimizes the process of rendering, thereby enhancing the performance of any computer graphics system into which the binning engine is incorporated.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

Figure 1:
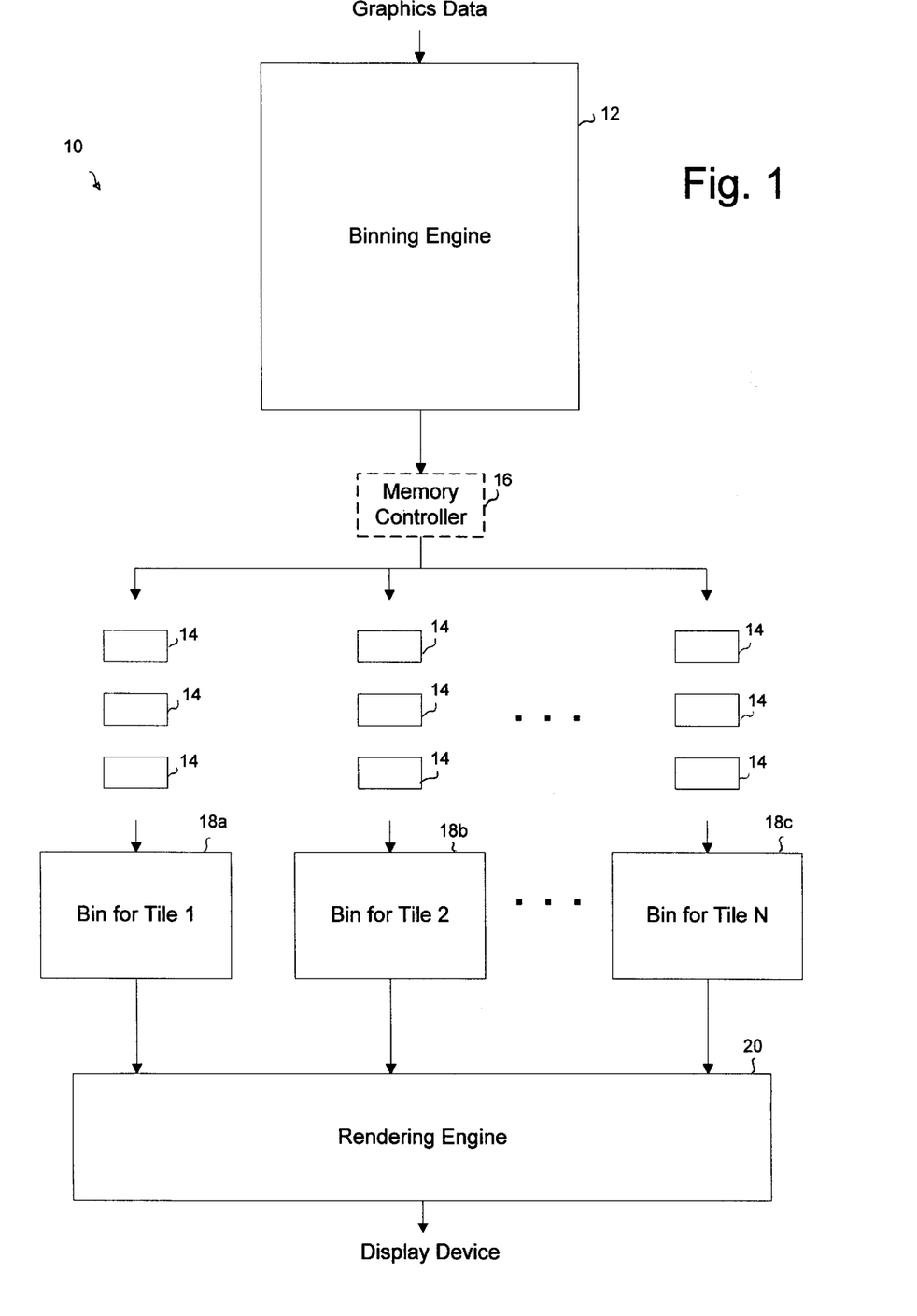
FIG. 1 illustrates a graphics system having optimized performance, in accordance with an embodiment of the present invention.

The preferred embodiments of the present invention and their advantages are best understood by referring to FIGS. 1 through 6 of the drawings. Like numerals are used for like and corresponding parts of the various drawings.

Graphics System

FIG. 1 illustrates a graphics system 10 having optimized performance, in accordance with an embodiment of the present invention. Graphics system 10 can be implemented with any suitable hardware, software, or a combination of both. In one embodiment, graphics system 10 can be implemented in whole, or in part, in one or more semiconductor devices, such as an application specific integrated circuit (ASIC) and supporting memory devices.

Graphics system 10 operates on graphics data which can be used to produce an image on a display device (e.g., a computer monitor). The graphics data may be generated by a dedicated geometry hardware or a central processing unit (CPU) of a host computer. Graphics data can be organized into words, each word comprising one or more bits of information.

Graphics data can include geometry data and mode data. Geometry data comprises information relating to various geometries (e.g., triangles, parallelograms, rectangles, circles, etc.) which can be processed to produce a complete image. For example, geometry data can specify the vertices (e.g., in X,Y,Z coordinates) and color (e.g., red-green-blue (RGB)) combinations for various polygons. In one embodiment, geometries which are connected to one another may be grouped into larger bodies, according to a fan technique, a strip technique, or other techniques which are well-understood by those in the field of computer graphics. These larger bodies are referred to "fans," "strips," or, more generally, "primitives." As used herein, a primitive comprises a plurality of polygons, the vertices of which are connected according to a defined connectivity structure.

Mode data comprises information relating to various modes which affect the appearance of one or more geometries when displayed. For example, for a given geometry, mode data can define or specify one or more "textures" (e.g., fur, brick, bark, sky), blending effects, translucence effects, and the like, which may be applied to the rendered geometry. Mode data may also specify or define primitives.

Figure 3:
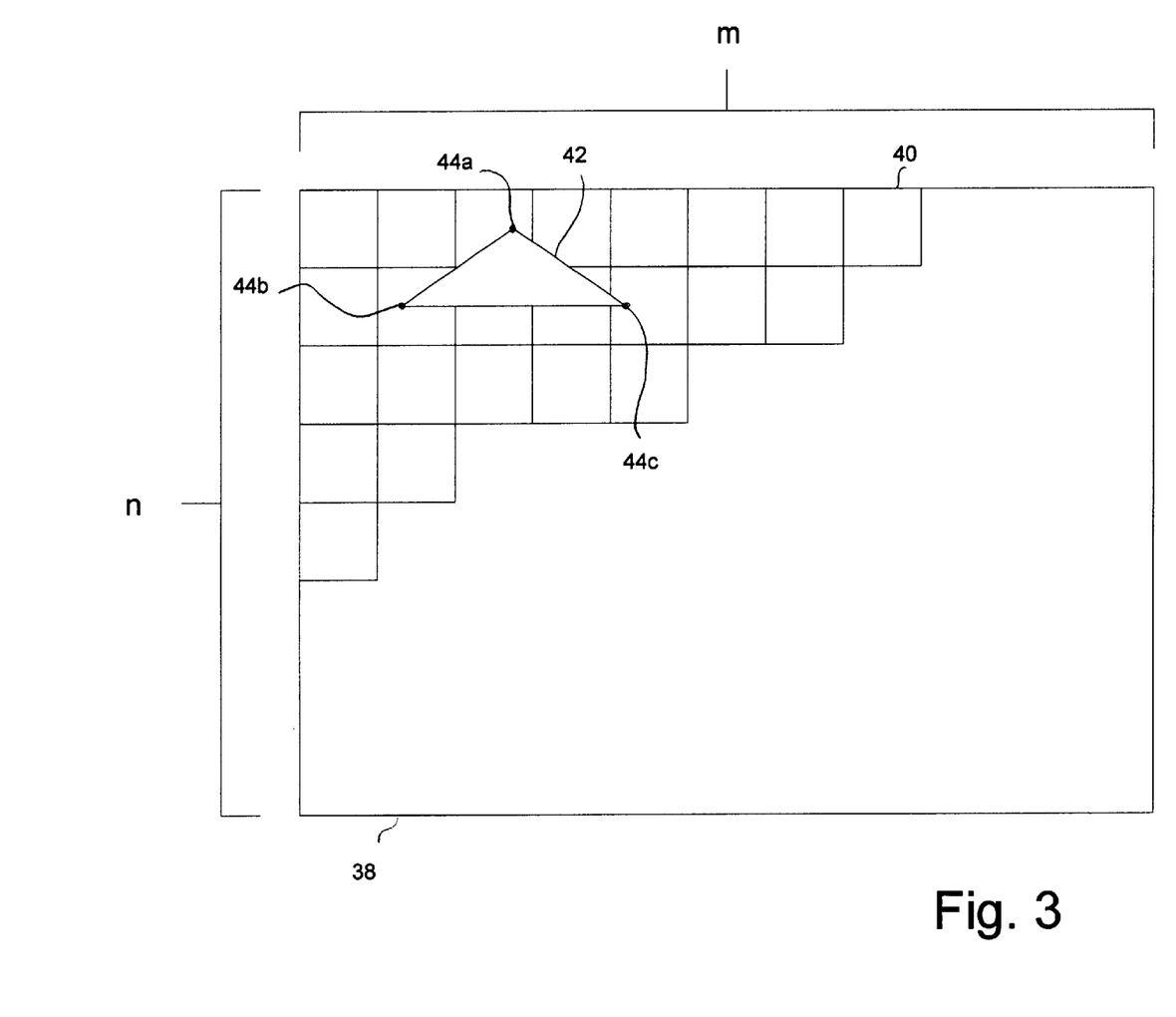
FIG. 3 illustrates an exemplary frame comprising a number of tiles.

A binning engine 12, which is implemented in hardware (preferably an ASIC) separate from a host computer, receives the graphics data (comprising geometry and mode data). Using the graphics data, binning engine 12 virtually reproduces the associated geometries and modes in an image frame which comprises a number of distinct regions referred to as tiles (FIG. 3). Binning engine 12 determines which tiles are "touched" by each geometry. For every tile, the graphics data for each geometry touching the tile is linked to the tile. This linked data is output by binning engine 12 in the form of data packets 14, each data packet 14 specific to a particular tile.

A memory controller 16 is coupled to binning engine 12. As used herein, the terms "coupled," "connected," or any variant thereof, means any coupling or connection, either direct or indirect, between two or more elements; the coupling or connection can be physical or logical. Memory controller 16 routes the data packets 14 for storage into various portions of memory (hereinafter referred to as "memory bins") 18 corresponding to various tiles, as further described below. Although FIG. 1 depicts memory controller 16 as a separate element, in another embodiment, memory controller 16 may be integral to (i.e., its functionality is performed within) binning engine 12.

In one embodiment, memory controller 16 may designate a separate, fixed region of memory for each tile. In another embodiment, memory controller 16 dynamically allocates "pages" of memory for each tile. In this embodiment, the memory of graphics system 10 appears as a large, virtual memory in which tile identification (ID) information may be used as the high-order bits of respective memory addresses. When operations for a particular tile are first begun (i.e., the tile is "opened"), a page of memory is specifically allocated for that tile. Graphics data for the tile is written to the opened page of memory. When the first page of memory for the tile fills up, another memory page is allocated for the tile. Memory controller 16 performs address translations so that the new memory page virtually appears in sequence after the previous memory page, even though the two pages of memory may actually be located in different (spaced-apart) physical regions of memory. Memory controller 16 also stores sequence values for each tile, and returns these values when tiles are opened. The memory pages are accessed during rendering (described below) of respective tiles, after which the pages are released and, thus made available for allocation again. Memory controller 16 allows reading and writing of memory using the physical addresses.

As depicted, memory bins 18 are separately designated with reference numerals 18a, 18b, and 18c. Each memory bin 18 can be a separate portion of memory and, as such, can be implemented in one or more memory devices, such as dynamic random access memory (DRAM) or static random access memory (SRAM). Furthermore, memory bins 18 can be set up in different architectures, such as, for example, system memory, unified memory, or local to a graphics integrated circuit (IC) device. A separate memory bin 18 is associated with, and provided for, each tile of an image frame. For example, as shown, memory bin 18a is associated with a "Tile 1," memory bin 18b is associated with a "Tile 2," and memory bin 18c is associated with a "Tile N." Each memory bin 18 receives and stores the graphics data of the data packets 14 associated with the same tile. That is, each memory bin 18 functions to contain the graphics data for each geometry touching (or, in some cases, merely proximate to) the respective tile. The graphics data contained within a given memory bin 18 can be used to generate the relevant portion of an image which should appear in the respective tile of an image frame. In some instances, the same graphics data can be stored into multiple memory bins 18 (e.g., more than one of memory bins 18a, 18b, and 18c); this occurs when a geometry defined by the graphics data touches more than a single tile. Memory controller 16 determines where the graphics data for a given tile resides in memory bins 18 and keeps the data for different tiles separate.

In an exemplary operation, to store the graphics data for a geometry touching "Tile 1" and "Tile 2," binning engine 12 in conjunction with memory controller 16 opens memory bin 18a for "Tile 1," stores the graphics data for that geometry, then opens memory bin 18b for "Tile 2," and stores the same graphics data again.

A rendering engine 20 is coupled to memory bins 18. In general, rendering engine 20 accesses the graphics data contained in memory bins 18 to render an image for display. With the graphics data stored into separate memory bins 18 for each tile of an image frame, rendering engine 20 can readily retrieve graphics data from each bin 18 to render the relevant portion of an image within the respective tile of a frame. Thus, the process of rendering an image is optimized within graphics system 10. That is, with the techniques described herein, graphics data is stored into memory such that it can be readily retrieved by rendering engine 20 to generate an image frame.

In operation for graphics system 10, graphics data is binned and rendered on a frame-by-frame basis. For example, in one time period, binning engine 12, in conjunction with memory controller 16, may open one or more memory pages for different tiles of a first image frame, and then store graphics data for such first frame into appropriate pages. The binning operation for the first frame is halted at the end of this time period. The stored graphics data is then available to rendering engine 20. In a subsequent time period, rendering engine 20 uses the graphics data previously stored into the various memory pages to render the first frame for display. Also during the subsequent time period, binning engine 12 and memory controller 16 open additional memory pages for the tiles of a second image frame. Graphics data for the second image frame is then stored into appropriate pages. After graphics data has been accessed from a memory page for rendering one image frame, that memory page is made available again for storing graphics data of another image frame. In one embodiment, the graphics data is buffered into two sets of memory: one set represents the binning frame, another set represents the rendering frame.

Binning Engine

Figure 2:
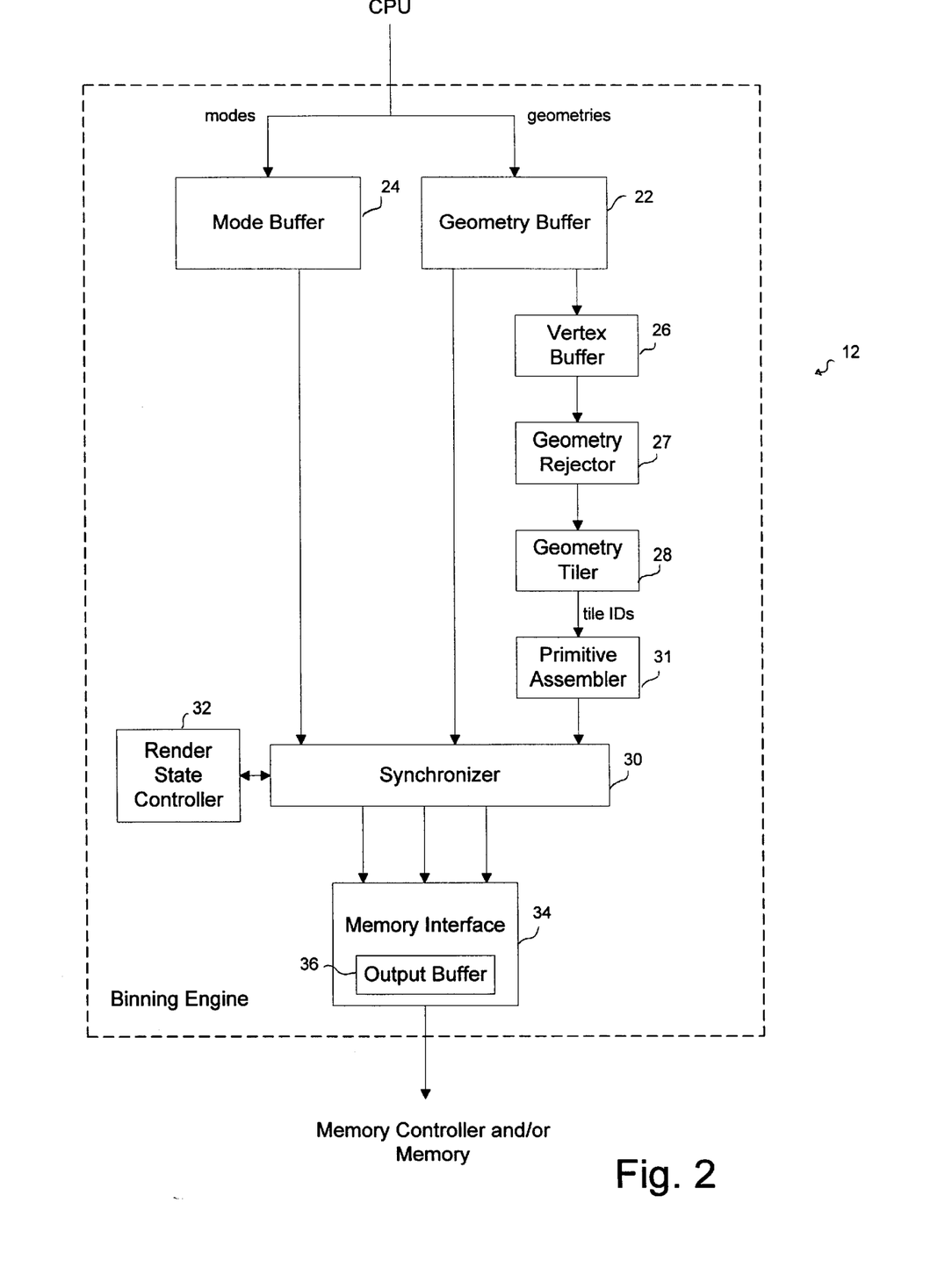
FIG. 2 is a block diagram of a binning engine implemented in hardware, in accordance with an embodiment of the present invention.

FIG. 2 is a block diagram for an exemplary embodiment of binning engine 12, in accordance with the present invention. Binning engine 12 is implemented in hardware, preferably in an ASIC. The elements described herein as forming binning engine 12 are understood by those in the art of computer graphics to be hardware elements. Binning engine 12 generally functions to selectively bin graphics data into the various memory bins 18 (FIG. 1). In particular, binning engine 12 operates on graphics data to determine which tiles in an image frame are touched by each geometry specified in and/or further defined by the graphics data; from this, binning engine 12 outputs synchronized graphics data packets 14 for storage into memory bins 18, each of which is specific to a particular tile.

The graphics data may be generated, and/or sent, by a central processing unit (CPU) or dedicated geometry processing hardware. Graphics data comprises information which can be used to generate or produce an image. The graphics data includes geometry data and mode data. In one embodiment, graphics data may be received, and/or operated upon, in two separate data streams: a Z-stream and a C-stream. The Z-stream contains vertex (e.g., X,Y,Z coordinates) data for various geometries along with some mode data. Such vertex data can be linked according to primitives formed from the geometries defined therein. The C-stream contains the red-green-blue (RGB) color data and texture information for various geometries.

In one embodiment, geometry data and mode data are received as separate flows into binning engine 12. As depicted in FIG. 2, for these separate flows of graphics data, binning engine 12 includes a geometry buffer 22 and a mode buffer 24. Geometry buffer 22 and mode buffer 24 each generally functions to buffer graphics data. In particular, geometry data is primarily buffered by geometry buffer 22, and mode data is primarily buffered by mode buffer 24. Geometry buffer 22 and mode buffer 24 can be implemented in the same or separate memory. In one embodiment, mode buffer 24 may comprise a first-in-first-out (FIFO) buffer.

Geometry buffer 22 and mode buffer 24 are advantageous in that they maintain efficient memory transfers. Furthermore, buffers 22 and 24 attenuate the variability in the amount of processing which may be needed for different geometries. That is, some geometries may touch many tiles, and thus require a relatively long time for processing of the associated graphics data; other geometries, however, may not even appear in the relevant image frame, and thus the associated graphics data can be discarded immediately. Geometry and mode buffers allow binning engine 12 to continue accepting graphics data even while processing large geometries, and conversely, to quickly discard graphics data when processing is unnecessary. This allows binning engine 12 to identify the tiles touched by one geometry while writing graphics data for the previous geometry to the appropriate memory bins 18. By pipelining these operations, binning engine 12 can keep its entire pipeline busy all of the time.

A vertex buffer 26, which is coupled to geometry buffer 22, comprises a queue to buffer vertices for one or more polygons defined by the geometry data. Each of these vertices can be specified in X,Y coordinates. In one embodiment, vertex buffer 26 can buffer the vertices for an entire primitive (e.g., strip or fan). In another embodiment, vertex buffer 26 can separate the vertices for individual geometries from a stream of vertices defining a primitive. That is, vertex buffer 26 identifies individual polygons (e.g., triangles) when certain techniques (e.g., fan and strip techniques) are used during the processing of graphics data.

In one embodiment, a geometry rejector 27 may be connected to vertex buffer 26 and receives the buffered vertices therefrom. Using this vertex data, geometry rejector 27 determines or identifies geometries which will not affect any visible pixels on the screen. For example, a geometry which is "back-facing" (i.e., pointed away from the viewer) or has zero area should not be visible on screen. That is, the order of vertices for a polygon is in either a clockwise or a counter-clockwise direction. Polygons with a clockwise ordering of vertices may be considered to be "front-facing" (i.e., pointed toward the viewer), whereas polygons with a counter-clockwise ordering may be considered to be "back-facing." This convention could be switched either by setting a register or hardcoding in binning engine 12. One way of determining clockwise or counter-clockwise ordering is by computing the area of a triangle, for example, using the following equation:

$$A = \tfrac{1}{2}[(y_1 - y_0)(x_2 - x_0) - (x_1 - x_0)(y_2 - y_0)]$$

where A is the area; $x_0$, $x_1$, and $x_2$ are the X coordinates for three vertices; and $y_0$, $y_1$, and $y_2$ are the Y coordinates for the three vertices. A positive value for A indicates a clockwise ordering, whereas a negative value for A indicates a counter-clockwise ordering. Geometry rejector 27 "rejects" geometries that are "back-facing" or have zero area by eliminating or discarding the geometry data therefor. Furthermore, geometry rejector 27 can reject geometries for tiles that are "off the screen"—i.e., do not lie within the image frame to be displayed. This technique, which may be referred to as "clipping," determines whether a particular tile is on a screen. In one embodiment, geometry rejector 27 can use area calculations to determine which geometries to reject. For example, because back-facing geometries have "negative" area and zero area geometries have no area, geometry rejector 27 may reject all geometries having respective areas equal to or less than zero.

By culling geometry data, geometry rejector 27 reduces unnecessary processing. In addition, the rejected geometry data does not consume bandwidth and binning memory. Furthermore, both the time required to write graphics data into memory bins 18 and the time required to read the graphics data from the same are reduced.

A geometry tiler 28 receives geometry data for geometries not rejected by geometry rejector 27. Using this geometry data, geometry tiler 28 virtually reproduces the respective geometries on relevant image frames, each image frame comprising a number of tiles (FIG. 3). For example, if the geometry data comprises vertices for various triangles, geometry tiler 28 creates the triangles in a virtual sense (i.e., no actual image is produced).

For each such geometry, geometry tiler 28 determines or identifies all tiles of an image frame which are touched by that geometry. In one embodiment, as well-known by those skilled in the art, this can be accomplished by placing a bounding box around the relevant geometry and identifying all tiles within such bounding box. In another embodiment, geometry tiler 28 identifies tiles that are covered by or touched by a geometry in several groups: (a) vertex tiles, (b) edge tiles, and (c) interior tiles. Vertex tiles are tiles that are covered by the vertices of the geometry. Edge tiles are tiles that are not at the vertices, but are covered by or touched by line segments that form edges of the geometry. Interior tiles are tiles that are not at the edges, but are located within an area enclosed by the edges of the geometry. In one implementation for this embodiment, geometry tiler 28 includes three components: a vertex tiler that identifies vertex tiles, an edge detector that identifies edge tiles, and an interior iterator that identifies interior tiles. Further details for this latter embodiment of geometry tiler 28 are provided in U.S. application Ser. No. 09/271,637 (Attorney Docket No. 019680-001600US), filed Mar. 17, 1999, entitled "A Method for Determining Tiles In a Computer Display That Are Covered By a Graphics Primitive," which is incorporated herein by reference in its entirety.

For each virtually generated geometry, geometry tiler 28 outputs a list of all the tiles which are touched. In one embodiment, the list may include not only the tiles which a geometry actually touches, but also tiles which are proximate to the geometry. The information on the list comprises tile identification (ID) information which may be output by geometry tiler 28 in the form of a data stream. In this sense, geometry tiler 28 links or "tags" each virtually generated geometry to all of the tiles touched by that geometry.

In one embodiment, a primitive assembler 31 is coupled to geometry tiler 28. Primitive assembler 31 functions to develop or assemble one or more primitives using the data output by geometry tiler 28. Such primitive can be a "strip" or a "fan" of polygons. These primitives can be the same as or different from primitives which are contained or defined in the stream received at geometry buffer 22. Preferably, for any given primitive developed by primitive assembler 31, the polygons contained therein all touch the same tile. As such, each primitive assembled by primitive assembler 31 may be associated with, or linked to, a particular tile.

A synchronizer 30 is coupled to each of geometry buffer 22, mode buffer 24, and primitive assembler 31. In general, synchronizer 30 uses the tile ID information generated by geometry tiler 28 and/or the primitive information generated by primitive assembler 31 to coordinate or "synchronize" the storage of geometry data, along with associated mode data, into the various memory bins 18, each of which corresponds to a particular tile of an image frame. In other words, because geometry data and mode data may be received at binning engine 12 in separate flows, synchronizer 30 synchronizes between these flows so that the appropriate mode data is binned with the geometry data.

More specifically, synchronizer 30 synchronizes the incoming flows of geometry and mode data and writes the graphics data contained therein to the various memory bins 18 according to the tiles which are touched by the geometries specified and defined by the same graphics data. For example, synchronizer 30 can receive a stream of tile IDs from geometry tiler 28, gather the appropriate vertices that need to be binned for each tile from geometry buffer 22, and write those vertices to the memory bins 18 corresponding to those tiles.

In some instances, the same graphics data may be stored into more than one memory bin 18, while in other instances certain graphics data may not be stored in any memory bin 18, but rather, discarded altogether. For example, if a particular triangle touches five tiles in an image frame, the geometry data specifying the vertices for that triangle are stored into the five memory bins 18 associated with those tiles. Mode data relevant to the same triangle may also be stored in each of the five bins. As another example, if a particular triangle does not touch any tiles at all, the geometry and mode data for that triangle is not stored into any memory bin 18.

In one embodiment, binning engine 12 bins vertex data on a geometry-by-geometry basis. That is, for any given geometry, geometry buffer 22 receives the vertices defining that geometry, geometry tiler 28 determines which tiles are touched by the defined geometry, and synchronizer 30 bins the geometry data for the vertices into respective memory bins 18 for the touched tiles.

In another embodiment, when primitive assembler 31 is provided, vertex data is binned on a primitive-by-primitive basis using the primitives developed or assembled by primitive assembler 31. As described above, each primitive assembled by primitive assembler 31 may be associated with, or linked to, a particular tile. As such, these primitives can be binned into memory bins 18 for the respective tiles. To accomplish this, primitive assembler 31 may identify which vertices will be binned into which memory bins 18 (by using information from geometry tiler 28), and may maintain a buffer for the same. Geometry tiler 28 sends the information for a geometry followed by tile ID information for all the tile touched by or proximate to, that geometry. Based on the tile ID information, for each tile, primitive assembler 31 collects all geometries within a primitive which touch that tile to form a new primitive for the tile. Binning of primitives (rather than geometries) when applicable provides more efficient use of memory space in memory bins 18 due to sharing of vertices.

As depicted, a render state controller 32 may also be coupled to synchronizer 30. Render state controller 32 operates on mode data and generally functions to bind each mode to the geometries which are affected. In one embodiment, render state controller 32 may direct that mode data be written into every memory bin 18 so that the corresponding modes are reflected in respective image frames at the appropriate time during rendering. In another embodiment, render state controller 32 may implement a technique referred to as deferred mode binding. Deferred mode binding bins mode data to only those memory bins 18 containing geometry data for geometries affected by the respective mode.

With deferred mode binding, the only mode data written into a memory bin 18 is that corresponding to odes which have changed since the last geometry was processed for that bin 18. To accomplish this, deferred mode binding uses time stamps which allow render state controller 32 to determine the last time geometry data was written to a particular memory bin 18 and the time that each mode changed. Render state controller 32 implements deferred mode binding by providing the following functionality: initializing synchronizer 30 for a new image frame; setting a mode to a value and noting the time such setting occurred; and identifying all modes with values which have changed since a particular time. Further details for a render state controller and the technique of deferred mode binding are provided in U.S. application Ser. No. 09/271,026 (Attorney Docket No. M-7123 US), filed Mar. 17, 1999, entitled "A Circuit and Method For Deferring the Binding of Render States To Primitives In a Graphics System," which is incorporated herein by reference in its entirety.

With regard to its general operation, synchronizer 30 can perform "synchronization" in various ways. For example, synchronizer 30 can synchronize geometry data with mode data. More specifically, in one embodiment, all mode data received from the CPU (or dedicated geometry processing hardware) is separately binned into each memory bin 18, while geometry data is binned only into the memory bins 18 for the tiles which are touched by the specified geometries. If mode data received by binning engine 12 at a later time is binned prior to geometry data received at an earlier time, such mode data could improperly affect the specified geometries when rendered, for example, by imparting the wrong texture. Accordingly, with this embodiment, synchronizer 30 ensures that any mode data sent by the CPU after given geometry data is not binned prior to the binning of the earlier-sent geometry data. This may be accomplished by providing a "geometry" mode in the flow of mode data. The geometry mode marks the place in the mode data flow where synchronizer 30 should, for a particular geometry, bin the geometry data to memory bins 18 corresponding to the tiles touched by that geometry, as specified by geometry tiler 28. When synchronizer 30 reaches a geometry mode in the mode data flow, it temporarily halts processing of the mode data until geometry tiler 28 has completed processing for the geometry—i.e., geometry tiler 28 has sent the tile ID information for all the tiles touched by the geometry. Once geometry tiler 28 indicates that it has completed processing for the geometry, synchronizer 30 resumes processing of the mode data.

Synchronizer 30 may also synchronize the operations of vertex buffer 26 and geometry tiler 28. That is, in another embodiment, vertices for one or more geometries are buffered in vertex buffer 26 of while X,Y coordinate data for these vertices are sent to geometry tiler 28. As geometry tiler 28 performs the processing for a geometry and communicates the resulting information to synchronizer 30, synchronizer 30 keeps track of which vertices in vertex buffer 26 are active, and hence, associated with the geometry currently being processed by geometry tiler 28.

Furthermore, synchronizer 30 may function to synchronize the writing of mode data into memory bins 18. In particular, for deferred mode binding, synchronizer 30 keeps track of when the various modes are altered, as well as when certain memory bins 18 are updated. Prior to binning the geometry data for a particular geometry into a memory bin 18 corresponding to a particular tile, synchronizer 30 determines or identifies the mode data which needs to be written into that memory bin 18 in order to bring the bin up-to-date with the current modes. Once the modes are synchronized, synchronizer 30 may write the relevant geometry data to the memory bin 18.

A memory interface 34 is coupled to synchronizer 30. Memory interface 34 generally functions to support the interaction of binning engine 12 with an optional memory controller 16 (FIG. 1) or memory bins 18. As shown in FIG. 2, memory interface 34 may include an output buffer 36. Output buffer 36 functions to hold graphics data until it can be binned into the appropriate memory bins 18. Output buffer 36 may comprise a memory to buffer a number of bytes of data. Output buffer 36 can be used in conjuction with a cache, which can be direct-mapped, set-associative, or any other suitable cache scheme, with the replacement of data according to least-recently used, random, or any other appropriate replacement scheme. In one embodiment, the cache may store or contain information for several tiles, this information including a timestamp and current address(es) for the tiles. Further, output buffer 36 may hold information for multiple tiles. This would reduce the number of memory bins 18 which need to be opened—thereby providing a savings in memory bandwidth—in cases where several consecutive geometries are all within a region of a few tiles. Using output buffer 36, binning engine 12 buffers graphics data into bursts, for example, of four 128-bit words each, for writing into memory bins 18. These bursts can be sent in data packets 14 (FIG. 1).

In one embodiment, output buffer 36 may itself comprise two separate buffers, one for the Z-stream and the other for the C-stream. Each of these buffers may have the capacity to buffer eight words, which are broken into two equally-sized sections. Each section contains a beginning or start address of the valid bytes contained in the buffer. During operation, output buffer 36 is periodically flushed of data. Flushing may be triggered by the occurrence of one or more conditions which, in one embodiment, may include the following: (1) data is written to the last byte in output buffer 36, or (2) a new tile ID is received from synchronizer 30.

The various embodiments of binning engine 12 described herein may operate in different ways. In one embodiment, geometry data is received, and operated upon, in the format of one geometry at a time. That is, for each geometry, binning engine 12 requires at least three separate vertices in the geometry data for defining the geometry, with such geometry being demarcated by its own separate start signal in the geometry data flow. Geometry tiler 28 determines or identifies which tiles are touched by the defined geometry, and synchronizer 30 bins the at least three vertices to the memory bins 18 corresponding to the tiles which are touched.

In another embodiment, geometry data is received, and operated upon, in the format of geometry lists. Each geometry list provides the vertex information for a plurality of geometries. Each geometry list is demarcated by its own separate start signal. Because a single start signal is provided for multiple geometries, this embodiment is more efficient than that described immediately above. In each geometry list, at least three separate vertices define each geometry. For example, if the geometries are triangles, the first, second, and third vertices define a first triangle; the fourth, fifth, and sixth vertices define a second triangle; and so on. Every third vertex serves as a "trigger" vertex, which indicates that such vertex, along with the two previous vertices, comprise a triangle. Geometry tiler 28 is capable of distinguishing or identifying the different geometries in each vertex list, for example, by recognizing the trigger vertices. Each geometry identified by geometry tiler 28 is operated upon in the same manner as described immediately above.

In yet another embodiment, geometry data is received and operated upon in the format of geometry primitives, such as, for example, triangle strips or fans. For each triangle strip, a list of vertices is provided, but the same vertices within the list may be used, in different combinations, to define more than one geometry. For example, the first, second, and third vertices define a first triangle; a fourth vertex, in combination with the second and third vertices, define a second triangle; a fifth vertex, in combination with the third and fourth vertices, define a third triangle; and so on. That is, in general, each additional vertex (after the third) on the list, in combination with the previous two vertices, defines a new triangle. Vertices lists for triangle fans are similar, except that each additional vertex is combined with the immediately preceding vertex and the first vertex to define a new triangle. Thus, where "i" represents one vertex on a list of 0 to n vertices, a strip defines triangles in the form of (i-2, i-1, and i), whereas a fan defines triangles in the form of (0, i-1, and i). In both such cases, vertex i serves as the "trigger" vertex. Once the geometries have been defined and identified, they are operated upon in the same manner as described above.

In addition, binning engine 12 may utilize various approaches to the actual binning of graphics data. In one embodiment, graphics data for each operational unit (e.g., geometry, geometry list, or geometry primitive, as described above) is binned into every memory bin 18 corresponding to a tile touched by that operational unit. Such an embodiment is somewhat inefficient for the following reasons. First, if several geometries of the same geometry list or primitive touch the same tile, the identification for that tile is generated multiple times, thereby resulting in that operational unit being binned multiple times into the same memory bin 18. Second, if all geometries of a given geometry list or primitive do not touch the same tile, the graphics data for some geometries is binned into memory bins for tiles which they do not touch.

To eliminate or reduce the inefficiency associated with the first reason, in another embodiment, primitive assembler 31 "remembers" all the tile identifiers produced for a given operational unit (e.g., geometry list or primitive). In one implementation, primitive assembler 31 maintains a list of all the tiles. At the start of operation upon a geometry list or primitive, all tiles on the list are marked "invalid." As tile identifiers are produced by geometry tiler 28, the corresponding tiles are marked as "valid." At the end of operation upon the list or primitive, graphics data for such operational unit is written to the memory bins 18 for all tiles marked "valid" within primitive assembler 31.

To eliminate or reduce the inefficiency associated with the second reason given above, in another embodiment, for each tile, primitive assembler 31 maintains a mask which lists the trigger vertices for all geometries touching the tile. When geometry tiler 28 begins operating on the geometry triggered by the jth vertex, it sends a signal to primitive assembler 31 indicating that all tile identifiers that it generates hereafter (until the next trigger) are for tiles touched by the geometry defined, for example, by vertices j-2, j-1, and j. Primitive assembler 31 sets the bit corresponding to trigger vertex j for all the tile identifiers generated by geometry tiler 28.

To further implement this latter embodiment, a mask cache may be provided for primitive assembler 31.

The primitive assembler mask cache maintains finite-sized masks for a limited set of tiles. To work with finite-sized masks, in one alternative, the primitive assembler mask cache may be flushed when geometry tiler 28 advances to the (j+1)th vertex (if the mask maintains only j bits). In another alternative, all masks having a least significant bit (LSB) which is set are flushed, and the remaining masks are shifted. This alternative essentially maintains a sliding window of vertices. The primitive assembler mask cache can be implemented as direct-mapped, set-associative, or any other suitable cache scheme, and replacement of data can be according to least-recently used, random, or any other appropriate replacement scheme.

Exemplary Frame

FIG. 3 illustrates an exemplary frame 38 in which an image can be displayed. Frame 38 comprises or is divided into a number of regions or tiles 40. For clarity, only one tile 40 is marked with a reference numeral. Tiles 40 can be organized in an n×m array in frame 38. In one embodiment, frame 38 comprises a 20×15 array of tiles, for a total of 300 tiles.

Each tile 40 may comprise one or more picture elements ("pixels"), which also may be organized in an array. In one embodiment, each tile 40 comprises a 32×32 array of pixels, for a total of 1024 pixels. A portion of the overall image is displayed in each tile 40. Tiles 40 can be identified by respective tile identifications (IDs). Each such tile ID can be an alphanumeric combination, a set of X,Y coordinates, or any other mechanism which uniquely identifies the respective tile.

One or more geometries, such as exemplary geometry 42, may be generated on frame 38. Each geometry 42 may be contained in or touch one or more tiles 40. In one embodiment, each geometry 42 can be a polygon having three or more vertices 44, such as exemplary vertices 44a, 44b, and 44c. When rendered, the appearance of geometry 42 can be affected by various modes. A mode, for example, can define which texture, such as fur, brick, bark, or sky, is applied to geometry 42. In general, a geometry is defined by geometry data, and the modes affecting such geometry are specified in mode data.

Operation—Graphics System

Figure 4:
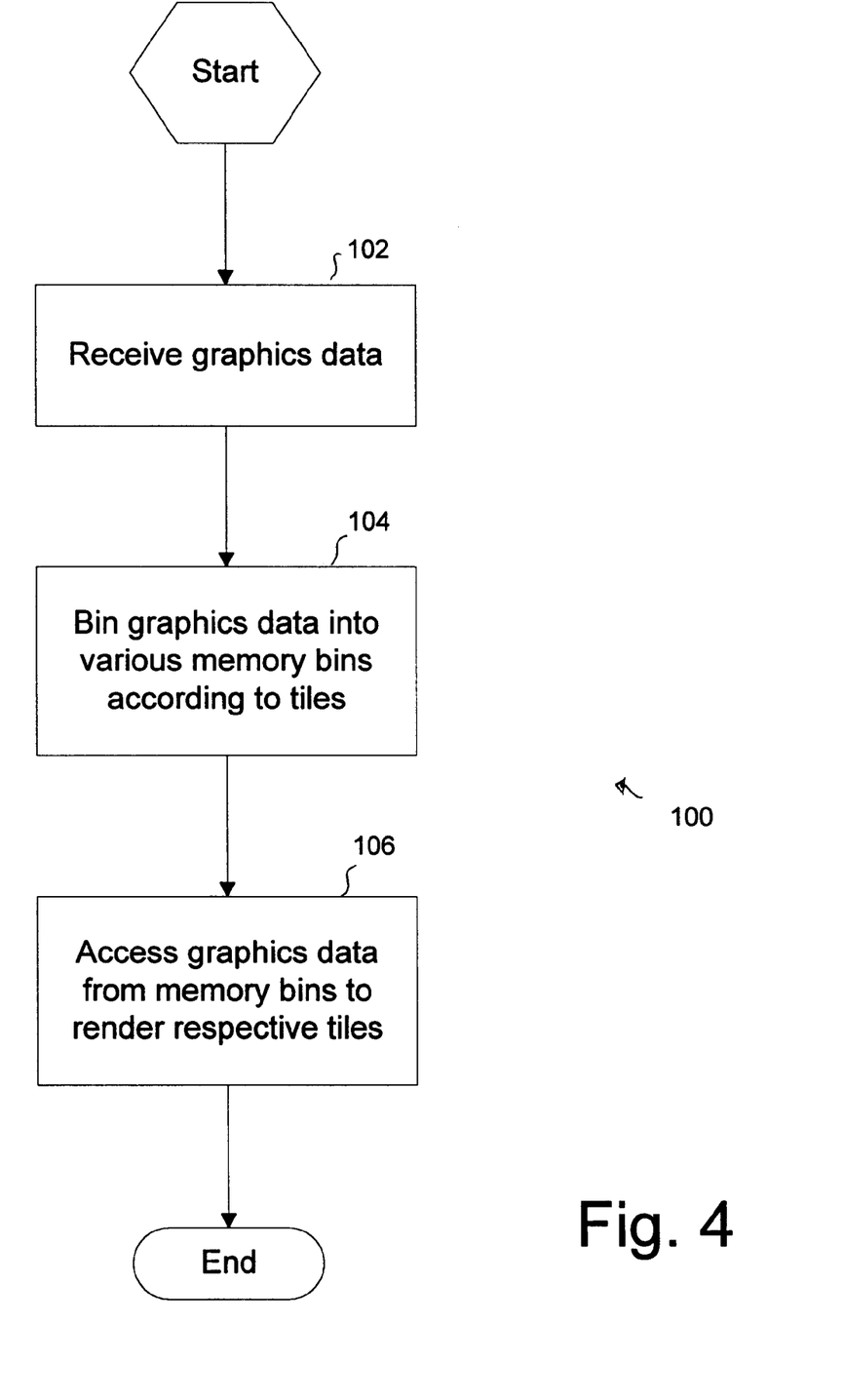
FIG. 4 is a flow chart of a method for optimizing the process of rendering an image frame, in accordance with an embodiment of the present invention.

FIG. 4 is a flow chart of a method 100 implemented in hardware for optimizing the process of rendering an image frame, in accordance with an embodiment of the present invention. Method 100 corresponds to an exemplary operation for graphics system 10 (FIG. 1).

Method 100 begins at step 102 where graphics system 10 receives graphics data at binning engine 12. As described above, graphics data can include geometry data, for specifying or defining various geometries, and mode data, which affects the appearance or position of the geometries. Binning engine 12 is implemented in hardware (e.g., preferably as part of an ASIC).

At step 104, binning engine 12 in conjunction with memory controller 16 selectively stores or bins the graphics data into various memory bins 18, each of which is associated with a respective tile of an image frame. The graphics data is stored according to tile and image frame. That is, for each geometry specified in the graphics data, binning engine 12 determines which tiles of an image frame are touched. The graphics data for such geometry is then stored into the respective memory bins 18 for each tile. In one embodiment, binning engine 12 may assemble primitives (e.g., fans or strips) from the geometries and then bin the graphics data for the assembled primitives.

At step 106, rendering engine 20 accesses the stored graphics data from memory bins 18 in order to render an image. In particular, for each tile of an image frame, rendering engine 20 uses the graphics data stored in a respective memory bin 18.

Method 100 then ends.

Operation—Geometry Tiler

Figure 5:
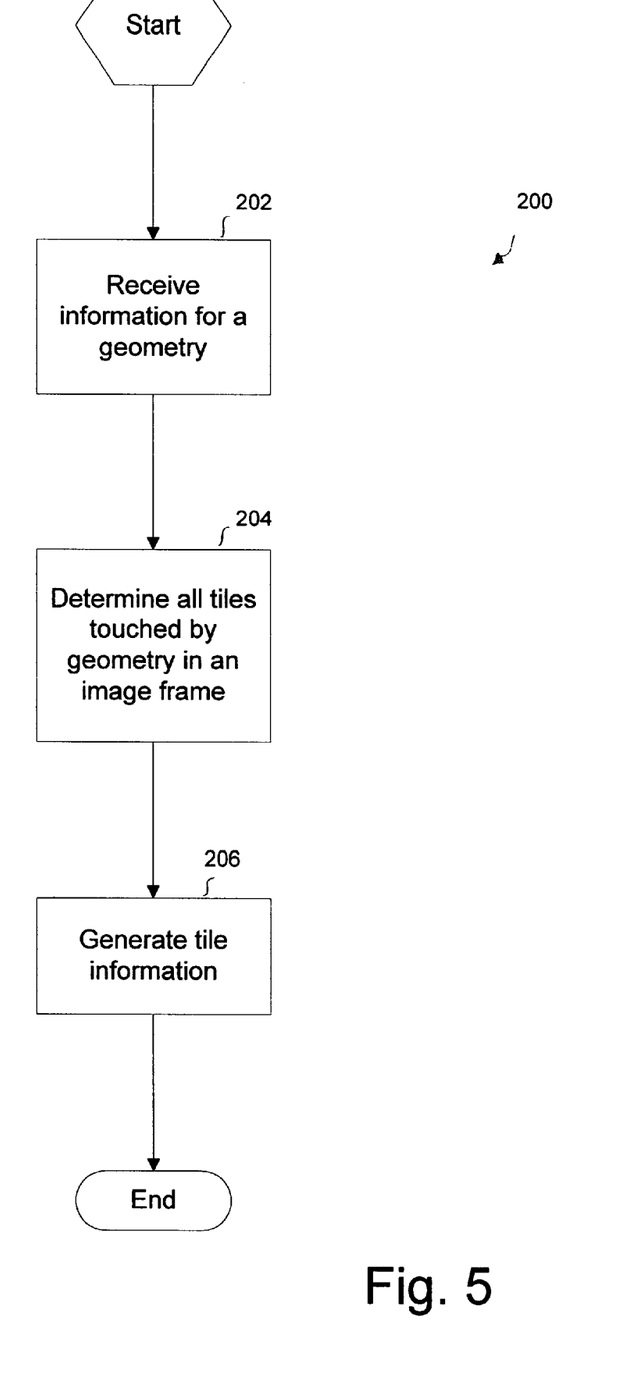
FIG. 5 is a flow chart of a method for generating tile information, in accordance with an embodiment of the present invention.

FIG. 5 is a flow chart of a method 200 for generating tile information, in accordance with an embodiment of the present invention. Method 200 corresponds to an exemplary operation for geometry tiler 28 of binning engine 12 (FIG. 2). Method 200 may be performed on a geometry-by-geometry basis.

Method 200 begins at step 202 where geometry tiler 28 receives information for a particular geometry. This information may include geometry information, such as X,Y coordinates defining one or more respective vertices for the geometry. Using the received geometry information, geometry tiler 28 may virtually generate or construct the geometry, for example, by plotting and connecting the vertices on a virtual rendition of an image frame comprising a number of tiles.

At step 204, geometry tiler 28 determines all the tiles of the image frame which are touched by the geometry. That is, geometry tiler 28 determines all tiles within which at least a portion of the geometry lies. In one embodiment, this can be accomplished by analyzing X,Y coordinates for the various vertices against X,Y coordinates for the different tiles.

At step 206, geometry tiler 28 generates tile identification (ID) information. Tile ID information generally comprises data which identifies at least all tiles touched by the particular geometry. Tile ID information may include a list of tile IDs. The tile ID information can be sent to synchronizer 30 for use in binning graphics data for the same geometry. Afterwards, method 200 ends.

Operation—Synchronizer

Figure 6:
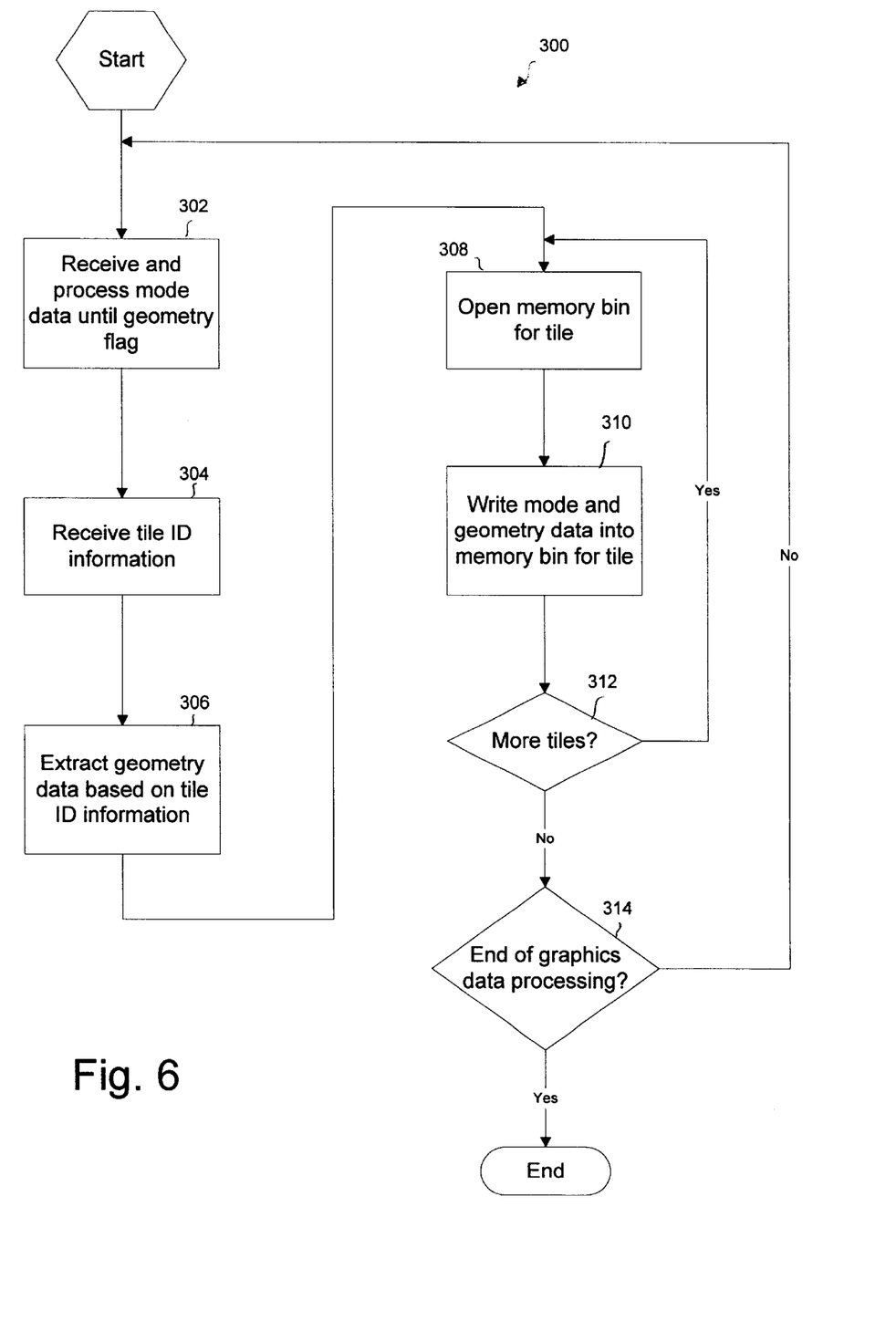
FIG. 6 is a flow chart of a method for synchronizing graphics data, in accordance with an embodiment of the present invention.

FIG. 6 is a flow chart of a method 300 for synchronizing graphics data, in accordance with an embodiment of the present invention. Method 300 corresponds to an exemplary operation for synchronizer 30 in binning engine 12 (FIG. 2).

Method 300 begins at step 302 where synchronizer 30 receives and processes mode data, for example, from mode buffer 24. Mode data may comprise graphics data which defines various aspects of a graphical image when it is rendered. Synchronizer 30 may cooperate with render state controller 32 for processing the mode data. Mode data is processed until synchronizer 30 receives a geometry flag. The geometry flag indicates that geometry data specifying a particular geometry is ready to be processed.

At step 304, synchronizer 30 receives tile ID information, for example, from geometry tiler 28. The tile ID information may specify which tiles in an image frame are touched by the specified geometry. At step 306, synchronizer 30 extracts the relevant geometry data from geometry buffer 22 based on the tile ID information.

At step 308, synchronizer 30, in conjunction with memory interface 34, accesses or opens a memory bin 18 corresponding to one of the tiles touched by the specified geometry. At step 310, synchronizer 30 and memory interface 34 write mode and geometry data into memory bin 18 for the relevant tile. This mode and geometry data generally comprises graphics data which can be used to generate the portion of an image which should appear in the relevant tile. Coordination of the mode data with the geometry data is handled by render state controller 32 which, in one embodiment, implements a deferred mode binding technique. In one embodiment, primitive assembler 31 may assemble one or more primitives from the geometries specified by the geometry data, with each primitive relating to or being associated with a particular tile. The geometry data for the primitives are then binned according to tile.

At step 312, synchronizer 30 determines whether there are more tiles touched by the specified geometry which should be processed (i.e., graphics data should be binned into the memory bins 18 corresponding to the tiles). If so, method 300 returns to step 308 where synchronizer 30 opens the memory bin 18 for another tile.

Synchronizer 30 repeats steps 308 through 312 until geometry and mode data for a particular geometry are stored into each memory bin 18 corresponding to a tile touched by the geometry.

When it is determined at step 312 that there are no other tiles touched by the relevant geometry, then at step 314 synchronizer 30 determines whether there is an end of graphics data processing. If not, method 300 returns to step 302 where synchronizer 30 receives and processes mode data until the next geometry flag. Method 300 repeats steps 302 through 314 until there is an end of graphics data processing. At this time, method 300 ends.

Pseudo-code for implementing a hardware binning engine according to an embodiment of the present invention is provided in Appendix A, which is included as a microfiche appendix. To translate between various terms used herein and corresponding terms used in the pseudo-code, the following table is provided:

| Term Used Herein: | Term Used In Pseudo-code: |
| --- | --- |
| vertex buffer | vertex stack |
| render state controller | mode_control |

To translate between the various steps described herein and corresponding modules in the pseudo-code, the following table is provided:

| Step Described Herein: | Module(s) In Pseudo-code: |
| --- | --- |
| Step 202 | input (pp. 1–3) |
| Step 204 | triangle_maker (pp. 3–5); geometry_rejector (pp. 5–7); geometry_tiler (pp. 7–18); primitive_assembler (pp. 18–22) |
| Step 206 | synchronizer (pp. 22–25); mode_control (pp. 25–26) |
| Step 302 | synchronizer (pp. 22–25); mode_control (pp. 25–26) |
| Step 304 | synchronizer (p. 23) |
| Step 306 | synchronizer (p. 24) |
| Step 308 | synchronizer (p. 24); memory_interface (p. 28) |
| Step 310 | synchronizer (p. 24); memory_interface (p. 28) |
| Step 312 | synchronizer (p. 24) |

According to previously developed techniques, a binning engine is implemented in software which is executed by the host computer in a graphics system. A technical advantage of the present invention includes a binning engine 12 implemented in hardware, as described herein. This hardware binning engine 12 is separate from the host computer and performs its own processing. As such, hardware binning engine 12 (in accordance with one embodiment of the present invention), reduces the processing workload of a host computer in a computer graphics system. Furthermore, because the graphics data for a single geometry may be binned into the memory bins for several tiles, there can an increase in the total amount of data after binning. If binning is performed on the host computer (as required with previously developed techniques), more bandwidth is needed to transfer the binned graphics data to the rendering hardware. Since this bandwidth is often the limiting factor in determining how much graphics data can be transformed, a binning engine implemented in software and executing on a host computer is at a serious disadvantage relative to hardware binning engine 12.

While particular embodiments of the present invention and their advantages have been shown and described, it should be understood that various changes, substitutions, and alterations can be made therein without departing from the spirit and scope of the invention as defined by the appended claims.

What is claimed is:

1. A method implemented in hardware for optimizing the rendering of an image comprising:
   dividing an image frame into a plurality of tiles having predetermined sizes independent of the image;
   receiving input graphics data comprising geometry data and mode data;
   processing the geometry data separately from the mode data;
   synchronizing processed geometry data with its corresponding mode data; and
   selectively storing the synchronized geometry and mode data into a separate, corresponding portion of memory for each tile touched by the geometry.

2. The method of claim 1 wherein processing comprises determining each tile in the image frame touched by a geometry.

3. The method of claim 2 wherein determining comprises virtually generating the geometry.

4. The method of claim 2 wherein determining comprises analyzing X,Y coordinates for a plurality of vertices for the geometry against X,Y coordinates for each tile in an image frame.

5. The method of claim 2 wherein the processing further comprises generating tile identification information for each tile touched by the geometry.

6. The method of claim 2 wherein the processing further comprises buffering the graphics data at an input.

7. The method of claim 2 wherein the processing further comprises assembling a primitive using the geometry.

8. The method of claim 2 wherein the processing further comprises rejecting a geometry.

9. The method of claim 3 further comprising receiving geometry data and mode data in two separate data streams.

10. The method of claim 9 further comprising:
    buffering the geometry data in a first buffer; and
    buffering the mode data in a second buffer,
    wherein, new mode data can be received by the second buffer as old geometry data is being processed.

11. The method of claim 10 further comprising:
    generating tile identification information for each tile touched by the geometry; and
    synchronizing storage of the geometry data with its corresponding mode data into each corresponding portion of memory based on the tile identification information.

12. A graphics system that employs a tiling architecture wherein an image frame is divided into a plurality of tiles of predetermined size, comprising:
    a binning engine implemented in hardware and coupled to receive input graphics data comprising geometry data and mode data, and operable to separately process the geometry data and the mode data in a pipelined fashion, and to determine each tile in the image frame touched by a geometry; and
    a separate portion of memory corresponding to each tile touched by the geometry and coupled to the binning engine, each portion of memory operable to selectively store geometry data and mode data for the geometry.

13. The graphics system of claim 12 wherein the binning engine comprises a synchronizer operable to synchronize storage of the geometry data with the mode data into each portion of memory.

14. The graphics system of claim 11 wherein the binning engine comprises a geometry tiler operable to identify each tile touched by the geometry.

15. The graphics system of claim 14 wherein the geometry tiler is operable to generate tile identification information.

16. The graphics system of claim 11 further comprising a rendering engine operable to access the graphics data stored in each portion of memory in order to render a portion of an image for the respective tile.

17. The graphics system of claim 11 wherein the binning engine comprises a memory interface operable to interface the binning engine with each memory bin.

18. The graphics system of claim 11 wherein the binning engine comprises a buffer for buffering graphics data at an input.

19. The graphics system of claim 18 wherein the buffer is operable to buffer graphics data for multiple tiles.

20. The graphics system of claim 18 wherein the buffer is implemented using a cache memory.

21. The graphics system of claim 11 wherein the binning engine comprises a vertex buffer operable to buffer vertices for the geometry.

22. The graphics system of claim 11 wherein the binning engine comprises a primitive assembler operable to assemble a primitive using the geometry.

23. The graphics system of claim 11 wherein the binning engine comprises a geometry rejector operable to reject the geometry.

24. In a graphics system that employs a tiling architecture wherein an image frame is divided into a plurality of tiles of predetermined size, a binning engine implemented in hardware comprising:
    a buffer operable to buffer graphics data, the graphics data comprising geometry data and mode data specifying one or more geometries;
    a geometry tiler coupled to the buffer, the geometry tiler operable to identify each geometry specified in the graphics data which touches a tile; and
    a synchronizer coupled to the geometry tiler, the synchronizer operable to coordinate the storage of geometry data along with corresponding mode data for each identified geometry into a separate portion of memory corresponding to the tile.

25. The binning engine of claim 24 wherein the buffer comprises a vertex buffer operable to buffer vertices for the geometries.

26. The binning engine of claim 24 wherein the buffer comprises a vertex buffer operable to buffer vertices for a primitive.

27. The binning engine of claim 24 where in the buffer comprises a vertex buffer operable to separate, vertices for individual geometries from a stream of vertices defining a primitive.

28. The binning engine of claim 24 further comprising a primitive assembler operable to develop or assemble one or more primitives using the graphics data.

29. The binning engine of claim 24 further comprising a geometry rejector operable to reject a geometry.

30. A method of processing graphics data representing three-dimensional images, comprising:

dividing an image frame into a plurality of tiles of predetermined size independent of an image;

separating an input stream of graphics data into a stream of geometry data and a corresponding stream of mode data;

buffering the stream of geometry data and the stream of mode data in separate buffers;

processing the stream of geometry data on a per tile basis; and synchronizing storage of processed geometry data with its corresponding mode data into memory.

31. The method of claim 30 wherein the step of processing the stream of geometry data comprises:

storing vertex data associated with geometry data in a vertex buffer;

discarding geometry data associated with geometries that are determined to be invisible based on the vertex data;

virtually reproducing input geometries on relevant image frames; and determining each tile in an image frame touched by a geometry.

32. The method of claim 31 wherein the step of processing the stream of geometry data further comprises:

assembling multi-polygon primitives using the geometry.

33. The method of claim 32 wherein the step of determining comprises generating identification information for each tile touched by a geometry.

34. The method of claim 33 wherein the step of synchronizing comprises:

receiving buffered mode data;

processing mode data until a geometry flag is detected;

receiving the identification information for geometry data associated with the geometry flag;

extracting geometry data based on the identification information; and writing the geometry data and its corresponding mode data into memory.

35. The method of claim 34 wherein the step of writing comprises accessing a memory bin associated with the tile being processed.

36. In a graphics data processing system that employs a tiling architecture wherein an image frame is divided into a plurality of tiles of predetermined size, a binning engine comprising:

a geometry buffer coupled to receive and temporarily store geometry data;

a mode buffer coupled to receive and temporarily store mode data;

a geometry tiler coupled to the geometry buffer and configured to identify each tile of the image frame touched by a given geometry; and a synchronizer coupled to the geometry tiler and the mode buffer and configured to synchronize storage of geometry data along with its corresponding mode data into the memory.

37. The binning engine of claim 36 further comprising a geometry rejector coupled between the geometry buffer and the geometry tiler, and configured to discard geometry data associated with geometries that are not visible.

38. The binning engine of claim 37 further comprising a vertex buffer coupled between the geometry rejector and the geometry buffer, and configured to temporarily store vertices for one or more polygons defined by the geometry data.

39. The binning engine of claim 38 further comprising a primitive assembler coupled between the geometry tiler and the synchronizer, and configured to assemble one or more primitives using data it receives from the geometry tiler.

40. The binning engine of claim 39 further comprising a render state controller coupled to the synchronizer and configured to bind mode data to corresponding geometry data.

41. The binning engine of claim 36 further comprising a memory interface unit coupled to the synchronizer and configured to facilitate interface between the binning engine and memory.

42. The binning engine of claim 41 wherein the memory interface unit comprises an output buffer configured to temporarily store graphics data prior to being supplied to memory.

43. A graphics data processing system as in claim 40 comprising:

the binning engine set forth in claim 36; and memory coupled to the binning engine and configured to store graphics data generated by the binning engine, wherein the graphics data corresponding to each tile is stored in a corresponding portion of memory.

* * * * *

UNITED STATES PATENT AND TRADEMARK OFFICE
CERTIFICATE OF CORRECTION

PATENT NO.   : 6,344,852 B1
DATED        : February 5, 2002
INVENTOR(S)  : Zhu et al.

It is certified that error appears in the above-identified patent and that said Letters Patent is hereby corrected as shown below:

Column 15,
Line 43, please delete "3" and insert therefor -- 1 --.
Line 58, please delete the comma following "separate".

Column 16,
Lines 7, 13, 17, 20, 27, 30 and 33, please delete "11" and insert therefor -- 12 --.
Line 57, please delete "where in" and insert therefor -- wherein --.

Signed and Sealed this

Second Day of September, 2003

JAMES E. ROGAN
*Director of the United States Patent and Trademark Office*